United States Patent [19]

Bloink et al.

[11] 4,268,194

[45] May 19, 1981

[54] INDEPENDENT AXIAL AND RADIAL ADJUSTMENT FOR A GEAR CUTTER

[75] Inventors: Harry W. Bloink, Redford; Walter G. Huber, St. Clair Shores, both of Mich.

[73] Assignee: Illinois Tool Works Inc., Chicago, Ill.

[21] Appl. No.: 40,816

[22] Filed: May 21, 1979

[51] Int. Cl.³ ............................................. B26D 1/12
[52] U.S. Cl. ...................................... 407/22; 407/39; 407/41; 407/45; 407/49
[58] Field of Search ...................... 407/22, 36, 37, 38, 407/39, 41, 45, 49

[56] References Cited

U.S. PATENT DOCUMENTS

| | | | |
|---|---|---|---|
| Re. 22,891 | 6/1947 | Head | 407/22 |
| 781,851 | 2/1905 | Taylor et al. | 407/39 |
| 1,820,415 | 8/1931 | Wildhaber | 407/22 |
| 2,236,909 | 4/1941 | Johanson | 90/4 |
| 2,978,792 | 4/1961 | Slayton | 407/22 |
| 2,994,943 | 8/1961 | Carlsen et al. | 407/22 |
| 3,708,843 | 1/1973 | Erkfritz | 407/37 |
| 3,839,772 | 10/1974 | Shimomura et al. | 407/36 |
| 4,093,391 | 6/1978 | Bachmann et al. | 407/22 |

Primary Examiner—Leonidas Vlachos
Attorney, Agent, or Firm—Thomas W. Buckman; Richard K. Thomson

[57] ABSTRACT

Radial adjustment of cutter blades in a roughing hypoid gear cutter is effected by a tapered adjustment block. A differential screw engages threads in the block and in the cutter body to cause relative axial displacement. The taper on the adjustment block in cooperation with a tapered surface on the cutter body translates the axial displacement into a radial displacement of the upper surface of the adjustment block and the corresponding cutter blade. A pair of cap screws permit independent axial adjustment of each cutter blade. A one piece cutter body provides maximum simplicity and rigidity.

9 Claims, 5 Drawing Figures

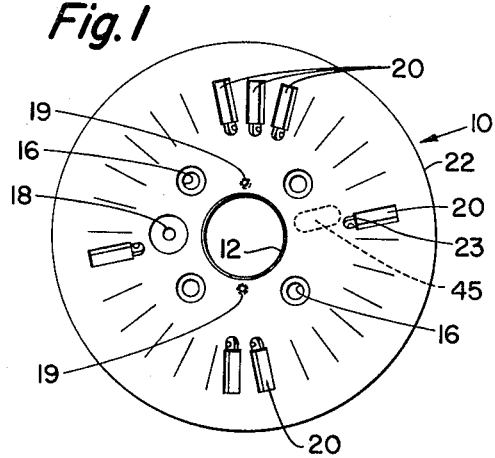
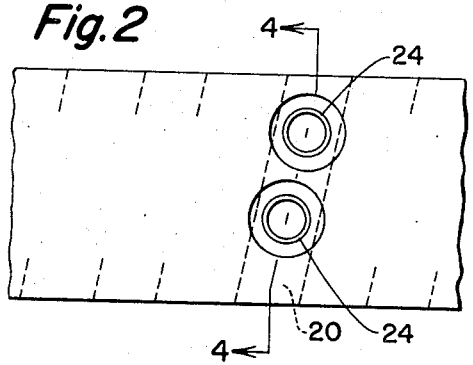
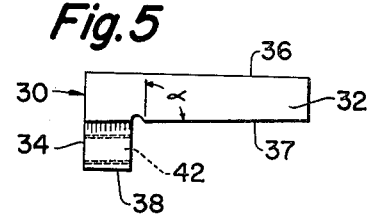
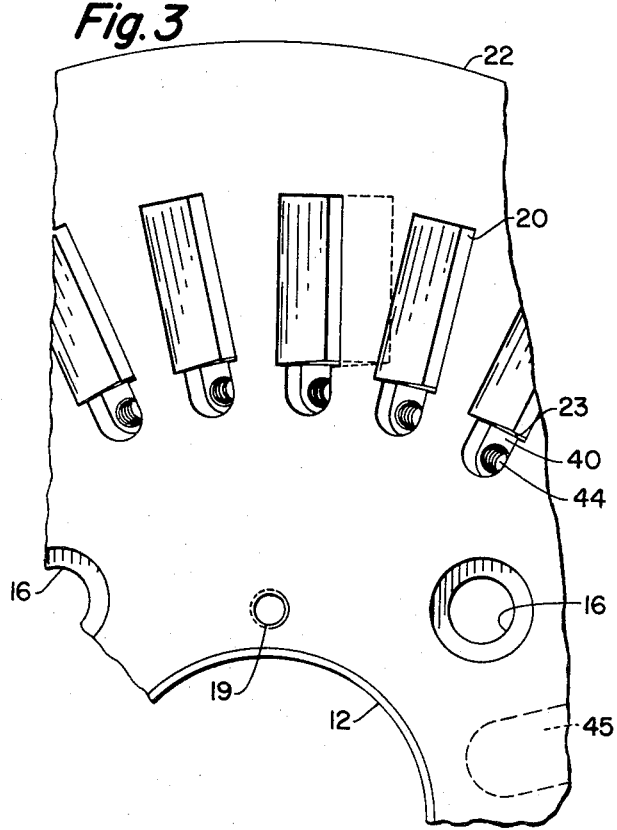
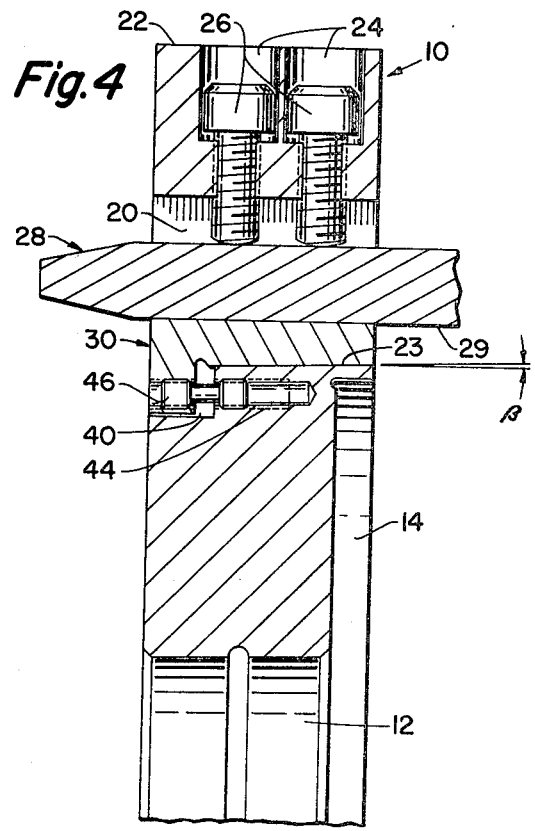

INDEPENDENT AXIAL AND RADIAL ADJUSTMENT FOR A GEAR CUTTER

BACKGROUND OF THE INVENTION

The present invention relates to rough milling cutters for machining hypoid gears and the like. More particularly, this invention is directed to an improved cutter design which permits independent radial and axial adjustment of each blade while maintaining a relatively simple configuration.

Prior milling cutters of this type as exemplified by U.S. Pat. Nos. 2,236,909 and 2,978,792, whose disclosures are herein incorporated by reference, provided no means to adjust the cutter blades axially of the cutter body while relying on a combination of shims and wedges to effect radial adjustment. Another design shown in U.S. Pat. No. Re 22,892 provided means to effect simultaneous radial and axial adjustment, but provided no means to effect either radial or axial adjustment without effecting the other. Still another, more recent, design shown in U.S. Pat. No. 4,093,391, whose disclosure is herein incorporated by reference, discloses a cutter design which would permit axial, but not radial, adjustment. This design also employs a separate outer locking ring to retain the cutter blades in adjusted position.

SUMMARY OF THE INVENTION

It is an object of the present invention to provide a milling cutter which has greater versatility due to its independent axial and radial adjustability.

It is further an object of the present invention to provide a milling cutter which is more easily machined for two reasons: (1) the cutter blades may be machined outside the cutter body; (2) the blades and mounting slots need not be machined to such fine tolerances due to the use of an adjustment block.

It is a further object to provide a milling cutter having greater rigidity and being of simpler design by eliminating the need for a locking ring.

These and other objects are achieved by a milling cutter having a one piece body with blade receiving slots therein. The bottom of each slot has a slight top-to-bottom taper which engages with a complementary taper on an adjustment block. An attaching finger on the adjustment block has an aperture therein which is tapped with a left-hand thread while an aligned aperture in the cutter body is tapped with a right-hand thread. These aligned apertures receive a differential screw which when rotated moves the adjustment block axially relative to the cutter body and the upper surface of the block radially relative to the cutter body. This upper surface forms the support for the cutter blades. The outer portion of the cutter body has two tapped apertures above each blade-receiving slot that threadingly engage two cap screws. These cap screws engage the outermost surface of the cutter blade clamping it in axial adjusted position against the adjustment block.

These and other objects, advantages and features of the present invention will be beter understood by reference to the following detailed description taken in conjunction with the accompanying drawings.

BRIEF DESCRIPTION OF THE DRAWINGS

FIG. 1 is a schematic representation of a side view of the rough milling cutter of the present invention with only a few of the blade-receiving slots being shown in order to simplify the drawing;

FIG. 2 is a partial top view of the milling cutter depicted in FIG. 1;

FIG. 3 is a more detailed view of the individual blade-receiving slots;

FIG. 4 is a partial section of the milling cutter shown in FIG. 1 taken along line 3—3 thereof; and FIG. 5 is a side view of the adjustment block for the milling cutter of the present invention.

DETAILED DESCRIPTION OF THE INVENTION

The milling cutter of the present invention is shown generally at 10. The milling cutter 10 is for roughing hypoid gears or the like and has a generally cylindrical configuration with an axial mounting recess 12 extending along the central axis. As can best be seen in FIG. 2, mounting recess 12 has a slight taper from one side of the milling cutter to the other. As an alternative, the taper may be formed along a portion of recess 12 and the remaining portion be cylindrical. The shaft (not shown) upon which the milling cutter is mounted has a corresponding taper to help control radial runout. The back of the milling cutter is recessed at 14 to receive a stabilizing plate (not shown) which may be integral with, or keyed to, the mounting shaft. The milling cutter may be bolted to the stabilizing plate by extending means (not shown) through apertures 16. A fifth aperture 18 is for gauging purposes while tapped holes 19 are used to assist in removing the cutter from the shaft by running screws therethrough into contact with the stabilizing plate.

A plurality of blade-receiving recesses or slots 20 (only some of which are shown) are equally spaced around the cutter body. These slots are positioned inwardly from the outer periphery 22 of the cutter body. The bottom surface 23 of the slot is inclined from horizontal (as shown in FIG. 2) by an angle "$\beta$" giving the slot a generally tapered configuration for reasons discussed in more detail herebelow. Above each slot are two threaded holes 24 which receive cap screws 26. These screws engage the upper surface of cutter blade 28 to maintain it in axially adjusted position.

Adjustment block 30 (best shown in FIG. 5), has a tapered main portion 32 and an attaching finger 34. The main portion 32 has a first planar surface 36 which, in operative position, extends generally parallel to the longitudinal axis and a second planar surface 37 that forms an angle "$\alpha$" with a plane which is perpendicular to said first surface. Angles "$\alpha$" and "$\beta$" are complementary (i.e., add up to 90°). The attaching finger 34 projects laterally from the main portion and has a semicircular extremity which is received in a correspondingly shaped recess 40 in the cutter body. The attaching finger 34 has a left-hand thread tapped therein indicated at 42 and the cutter body has a right-handed thread 44 tapped therein in alignment with the first thread, both of which are parallel to sloped surface 23.

In operation, a differential screw 46 is received in both apertures having left and right-hand threads corresponding to the left and right-hand threads in the adjustment block and cutter body, respectively. A suitable differential screw is commercially available as Kennametal STC-9. As the differential screw is rotated, relative axial motion occurs between the adjustment block 30 and cutter body. Due to the complementarily tapered surfaces 23 and 37, the axial movement is translated into radial movement of surface 36 of the adjustment block and, correspondingly, to radial adjustment of the position of the cutter blade.

The use of the adjustment block 30 eliminates the need to grind the bottom surface 23 of the slot and surface 29 of the cutter blade, which would otherwise be in contact, to the extremely close tolerances that such contact would otherwise necessitate. Any discrepancies in the tolerances can be compensated for using the adjustment block. In addition, the one piece design for the cutter body has obvious advantages of simplicity, strength and again, reduction in machining costs, over designs employing a separate locking ring, although the adjustment block could also be used with a two piece cutter design.

As is customary, the slots 20 are positioned at a slight angle, which may be on the order of 12°, with respect to perpendicular. Accordingly, the adjustment block 30 and cutter blade 28 will also be positioned at this angle (see FIG. 2). Also according to the usual practice, there are a plurality of sets of blades, each set being particularly designed to machine a specific portion of the gear tooth. The number of sets may conventionally be two or three and, in the latter case there is provided a first set to cut the left side of the gear tooth, a second set to cut the right side of the gear tooth and a third set to cut the bottom portion between the gear teeth. By way of example, the cutter body may have twenty-eight equally spaced slots to receive seven blades of the first set, seven blades of the second set and fourteen blades of the third set with these last occupying each alternate slot 20. The positions of the blades in the first and second sets alternate in the remaining slots. A drive recess 45 in the back side of the cutter body receives a projecting key (not shown) formed on the stabilizing plate. This permits the drive torque to be transmitted to the milling cutter by means other than the attaching bolts.

The ability to adjust the cutter blade, both axially and radially of the cutter body, by independent means gives greater versatility to the cutter and variety to the gear tooth patterns which can be formed. The amount of material removed can be adjusted by adjusting the radial positions of the blades. An additional feature of this design is that worn or cracked cutter blades can be replaced individually rather than as an entire set of twenty-eight as in the usual case. The present design permits adjustment while retaining the necessary rigidity with a simple configuration that is comparatively inexpensive to manufacture.

Although a particular embodiment has been disclosed, various changes, modifications, alternatives and variations will occur to the skilled artisan in light of the foregoing specification. Accordingly, it is intended that all such changes, modifications, alternatives and variations as are encompassed by the spirit and scope of the appended claims come within the invention.

We claim:

1. In a roughing milling cutter for machining hypoid gears and the like, said cutter having a generally cylindrical body with a substantially planar front face and having a plurality of slots for receiving a plurality of sets of cutter blades having their cutting edges projecting laterally outwardly from the body front face with no portion of the blades extending radially beyond the periphery of the cylindrical body, each respective set of blades being specially designed to machine a specific portion of a gear tooth, said milling cutter being mountable for rotation about its longitudinal central axis and the slots having a radially inward tapered surface forming an acute angle with the central axis, the improvement comprising means to permit adjustment of each cutter blade in a direction generally parallel to the axis of the cutter body and independently adjustable means to permit limited adjustment of each blade in a direction which is generally perpendicular to said axis, each said independently adjustable means including a recess radially inward of the slot and adjacent the body forward surface, an adjustment block having a tapering main portion and a laterally extending attaching finger, said main portion having a first planar surface for engaging a blade and a second planar surface opposite said first surface for engaging the slot tapered surface and forming an acute angle with a plane perpendicular to said first surface and which is complementary to the acute angle of the slot tapered surface to extend said first surface and the blade generally parallel to the cutter longitudinal axis, said attaching finger being received within said recess so as to be behind or coplanar with said body forward surface and including a first aperture therein extending generally parallel to the axis of the adjustment block and being tapped with a thread, a second aperture within said cutter body which is aligned with said first aperture and tapped in a direction opposite the tap of said first aperture, and a differential screw in threaded engagement in both said first and second apertures and countersunk within said first aperture so as to be behind said body forward surface, whereby, in operation, rotation of said differential screw causes axial displacement between the cutter body and adjustment block and, due to the complementary tapers thereon, causes radial displacement of the adjustment block first surface and, correspondingly, of the cutter blade.

2. The milling cutter of claim 1 wherein the means to permit axial adjustment comprises a pair of screw means threadingly engaged in the cylindrical body of the cutter, accessible from the exterior thereof, and frictionally engaging the surface of the cutter blade disposed farthest from the central axis of the cutter body to maintain said blade in its axially adjusted position.

3. The milling cutter of claim 2 wherein the cutter body is of a one piece design, and the pair of screw means threadingly engage in apertures in the radially outermost portion of said cutter body.

4. The milling cutter of claim 1 wherein said first aperture is tapped with a left-handed thread.

5. The milling cutter of claim 4 wherein the slot in said body which receives the cutter blades and the adjustment block is generally rectangular in cross section, and said second aperture being tapped with a right-handed thread.

6. The milling cutter of claim 5 wherein the generally rectangular blade-receiving slots are equally spaced about the cutter body and positioned inwardly from the outer periphery thereof.

7. The milling cutter of claim 1 wherein there are three sets of cutter blades: a first set to cut the left side of a gear tooth, a second set to cut the right side of a gear tooth and a third set to cut the bottom portion between teeth.

8. The milling cutter of claim 7 wherein the number of blades in the third set is equal to the total number of blades in the first and second sets.

9. The milling cutter of claim 1 wherein the cylindrical body has a tapered aperture extending generally along the central axis thereof.

* * * * *